US006728386B1

(12) United States Patent  
Andersen

(10) Patent No.: US 6,728,386 B1  
(45) Date of Patent: Apr. 27, 2004

(54) ELECTRO-ACOUSTIC COMMUNICATIONS UNIT

(75) Inventor: Morten Kjeldsen Andersen, Odder (DK)

(73) Assignee: Kirk Acoustics A/S, Horsens (DK)

( * ) Notice: Subject to any disclaimer, the term of this patent is extended or adjusted under 35 U.S.C. 154(b) by 66 days.

(21) Appl. No.: 10/088,577

(22) PCT Filed: Oct. 27, 2000

(86) PCT No.: PCT/DK00/00599

§ 371 (c)(1),
(2), (4) Date: Apr. 5, 2002

(87) PCT Pub. No.: WO01/33904

PCT Pub. Date: May 10, 2001

(30) Foreign Application Priority Data

Oct. 29, 1999 (DK) .................................. PA199901548

(51) Int. Cl.⁷ ................................................ H04R 1/02
(52) U.S. Cl. ........................................ 381/345; 455/90
(58) Field of Search ................................ 381/345, 347, 381/350, 351, 352, 370, 386; 455/90, 550, 568, 569, 570, 575; 379/428.01, 428.02, 429, 430, 431, 433.01, 433.02, 444, 447, 420.02

(56) References Cited

U.S. PATENT DOCUMENTS 5,949,896 A * 9/1999 Nageno et al. ............. 381/328
6,002,949 A * 12/1999 Hawker et al. ............. 455/569.1
6,104,808 A * 8/2000 Alameh et al. ............ 379/433.02
6,411,719 B1 * 6/2002 Moster et al. .............. 381/345

FOREIGN PATENT DOCUMENTS

| EP | 0 753 982 A2 | 1/1997 |
| EP | 0 909 110 A2 | 4/1999 |
| GB | 2 311 187 A | 9/1997 |
| WO | WO 98/24214 | 6/1998 |
| WO | WO 00/21330 | 4/2000 |

* cited by examiner

*Primary Examiner*—Curtis Kuntz
*Assistant Examiner*—Brian Ensey
(74) *Attorney, Agent, or Firm*—Oliff & Berridge, PLC

(57) ABSTRACT

An electro-acoustic communications unit (10) such as a mobile telephone and a telephone handset or headset. The unit has a receiver transducer (12) generating sound signals from a first side (15) of the transducer, and the sound signals are output from the unit through one or more openings (17) in the housing (11). The transducer (12) is secured to a structure of the unit with its first side facing away from that structure. The transducer can thereby be placed at any desired location in the unit including in particular other structures than the housing wall, and a volume in the housing is included in the sound path from the transducer to the user's ear. The telephone can thus be very compact and still be leak-tolerant.

11 Claims, 2 Drawing Sheets

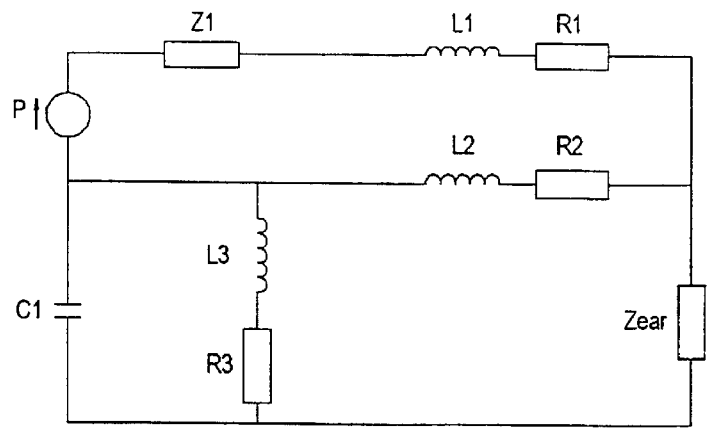
Fig. 1 - prior art
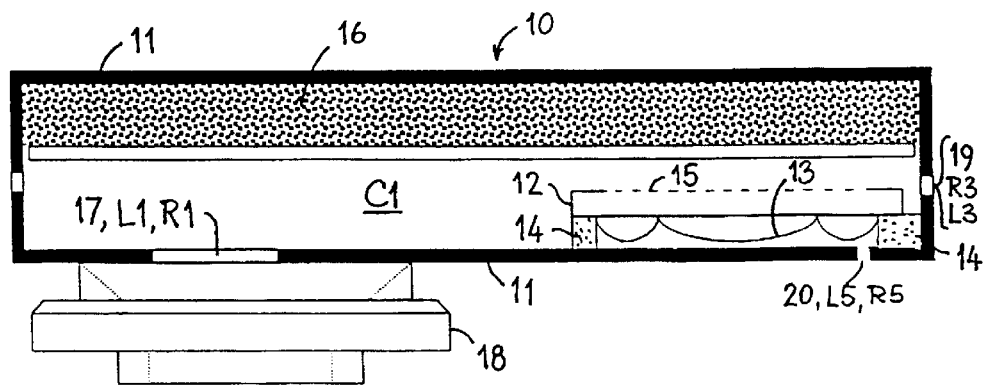
Fig. 2
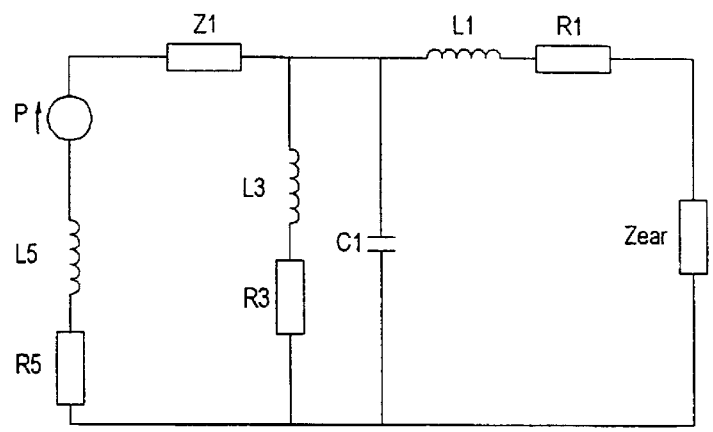
Fig. 3

ELECTRO-ACOUSTIC COMMUNICATIONS UNIT

The invention relates to an electro-acoustic communications unit such as a mobile telephone and a telephone handset or headset to be held in engagement with a user's ear, but also a headphone.

Particularly in the field of mobile telephones there has been a development toward units, which both weigh less and less and are smaller in size. This makes great demands on designers and manufacturers of electronic and electro-acoustic components, which here comprise microphone and sound generator or receiver transducers. These transducers, too, are available today in smaller dimensions than before.

The preferred electro-acoustic receiver transducers used here are of the electro-dynamic type with a diaphragm for generating acoustic signals in the form of sound with frequencies in the audible range. Traditionally, the transducer is secured to the inner side of the housing wall of the telephone, e.g. by means of an adhesive or a soft rubber fitting, which establishes a sealing. Acoustic connections in the form of apertures in the housing wall transmit sound generated by the transducer to the user's ear and have a carefully designed shape to give the desired acoustic impedance and frequency characteristic, when the telephone is in engagement with the user's ear. Traditionally, the transducer is secured to the inner side of the housing wall in the immediate vicinity of the acoustic connections.

A coil of electrically conductive wire secured to the diaphragm of the transducer drives the diaphragm in response to electric currents in the coil. Sound is thereby emitted from both sides of the diaphragm, whereby the transducer can be considered as a dipole. The preferred transducers are low acoustic impedance sound pressure generators where either side of the diaphragm can be used to generate sound to be transmitted to the user's ear. The principal difference between the sound signals from the two sides of the diaphragm is a phase shift of 180 degrees.

When the diaphragm moves, it emits sound to the user's ear from one side, traditionally referred to as the front side, and for the transducer to operate satisfactorily, it is necessary that an air volume of a certain size is available to the opposite side, traditionally referred to as the rear side, of the diaphragm, since the diaphragm will otherwise be blocked and prevented from moving. If a too small air volume is available to the rear side of the diaphragm, the sensitivity and thereby also the output of the transducer will be reduced at low frequencies. In addition, any leak in the assembly of the housing will, in combination with the small air volume at the rear side of the diaphragm, result in a frequency characteristic having an unfortunate course in the form of a notch. In other words, the diaphragm of the transducer must have a certain working volume of air on both sides of the diaphragm. With the traditional mounting of the speaker transducer closely to the inner side of the housing wall the front side of the diaphragm will have access, through openings in the housing wall, to the air volume in the user's outer ear, and the rear of the diaphragm will have access to an air volume within the housing, or, via openings in the housing, to the ambient air.

Mobile telephones and telephone handsets are tested for their acoustic quality using an ear simulator. The International Telecommunication Union (ITU) recommendation ITU-T P.57 and international standards such as IEC 318 and IEC 711 define ear simulators, all of which are based on the situation of use, where a user holds the telephone or the handset against his or her ear. To ensure reproducible measurements, these standards and recommendations provide guidelines for the mechanical and physical structure of the ear simulator and its acoustic function with a view to simulating a human ear as best as possible, and it is laid down how to carry out a test, including how to engage the telephone with the ear simulator, and in particular the accurate position and orientation of the telephone relative to the ear simulator.

This means that, for any given telephone, and on the basis of the standards, it is possible to define the engagement face of the telephone with the ear simulator in the standardized or recommended test, which, according to the standard or recommendation, will correspond to engagement with a user's ear. In the following, the expression "face for engagement with a user's ear" will therefore be used as a synonym for the engagement of the communications unit with a standardized ear simulator, as these faces are identical according to the foregoing.

Such standardized ear simulators are commercially available e.g. from Brüel & Kjær as type 4157, type 4185, type 4195 and type 4128. The engagement face is typically a circular area with a diameter of 25 mm, the ear simulator having a ring-shaped engagement face with a 25 mm diameter. Inwardly of the ring-shaped engagement face of the ear simulator there is an air volume corresponding to the volume of the human outer ear. This volume is the sound entrance opening of the ear simulator to a microphone by means of which the sound from the telephone may be registered.

The size of the air volume in the sound entrance of the ear simulator, or of the human ear, substantially influences the acoustic loading of the receiver transducer of the communications unit. Any leak to the surroundings may cause a considerable increase in this volume, which gives a significant change in the acoustic loading. Changes in the acoustic loading may cause measurement results, which do not correspond correctly to the acoustic properties of the communications unit, which it is desired to measure. To achieve correct and reproducible test measurements, which are characteristic of the communications unit, the communications unit must therefore, in accordance with the standards, be in a tight fitting relationship with the ring-shaped engagement face of the ear simulator.

In normal use, there will be considerable variations in the degree of the tightness of the engagement of the communications unit with individual users' ears, which gives greater or smaller acoustic leaks to the surroundings. Such variations influence the acoustic loading of the receiver transducer, which in turn, depending on the unit's sensitivity to the acoustic loading impedance, may change the acoustic properties of the communications unit. The user perceives such changes as variations in the sound quality of the communications unit. This is undesirable.

Accordingly, there is a need for communications units which are leak-tolerant, that is units which give a perceived sound quality for the user as well as measurement results on an ear simulator all of which, to the greatest extent possible, are independent of leaks both in the engagement of the unit with the user's ear and with the ear simulator.

WO 98/24214 and WO 00/21330 each disclose such a known mobile telephone using a leak-tolerant construction of the earpiece. FIG. 1 shows a simplified acoustic equivalent diagram of the acoustic impedances involved in connection with the speaker transducers in one such known telephone. The speaker transducer is shown as a sound pressure generator P with a complex acoustic output impedance Z1. L1 and R1 represent the acoustic impedances in the path from the "front side" of the speaker transducer through the sound outlet opening to the user's ear, which is represented by the loading acoustic impedance Zear. L2 and R2 represent the acoustic impedances in the sound path from the "rear side" of the speaker transducer to an opening to the user's ear, whereby the telephone is made leak-tolerant. L3 and R3 represent the acoustic impedance in the leakages of the telephone housing shells, and C1 represent the inner air volume in the telephone.

In FIG. 1, C1 in parallel with L1 constitute a parallel resonator on the rear side of the speaker transducer. This parallel resonator has a resonance frequency with a very high impedance. At the resonance frequency the high impedance more or less blocks the diaphragm and prevents it from moving, whereby an undesired notch in the frequency response is created. Small inner air volumes result in a more severe notch than larger air volumes do. Mobile telephones are made ever smaller and more compact with the inner air volume reduced to the smallest possible, whereby the problem with the notch in the frequency response becomes even more severe.

Telephones having a very small inner air volume cannot, with the prior art, readily be made leak-tolerant, as leak tolerance requires that the transducer has access to a certain air volume behind the transducer—typically some $cm^3$. For purely acoustic reasons, a large inner air volume would be desirable, but this is not acceptable, since this will increase the size of the unit. As an alternative to a large inner air volume, acoustic openings could be established from a small inner air volume to the ambient air outside the telephone. The transducer would hereby have access via the small inner air volume to an infinitely large air volume, and a leak-tolerant function could be achieved. Such a structure with a small inner volume will form an acoustic resonance circuit consisting of the acoustic inductance of these acoustic openings and the acoustic capacitance of the small inner air volume. Such a resonance circuit will cause the frequency response of the telephone to have a relatively deep and sharp notch, which will be determined by the geometry of the openings and the inner air volume and will unfortunately often be in the middle of the useful audio frequency range.

SUMMARY OF THE INVENTION

With the present invention it has become possible to make the acoustic properties, and in particular the frequency response of the receiver transducer, essentially independent, or at least less dependent, on the size of the inner air volume in the communications unit.

This is due to the fact that, according to the invention, the air volume, which is always present within the housing of the communications unit, is now included in the primary transmission path from a first side of the diaphragm of the transducer through the sound outlet to the user's ear. The opposite side of the diaphragm is loaded by an acoustic impedance specifically designed so that, under normal and all practical conditions of use and in particular also other conditions than the standardised test conditions with an ear simulator, it will dominate over the acoustic impedance in the primary transmission path. The transducer is preferably of the type having a low frequency boost, ie it has an elevated sensitivity at low frequencies, and the primary transmission path is also vented to the ambient air through an acoustic connection to the ambient air. This acoustic connection is designed to compensate for the low frequency boost and give the desired frequency response, particularly at low frequencies. The communications unit is hereby made leak-tolerant as described above.

The designers of communications units such as mobile telephones will hereby be given freedom in choosing the place for the transducer within the telephone housing. Traditionally, the designer's freedom in placing the receiver transducer has been restricted to the inner side of the housing wall for engagement with the user's ear and the close vicinity of the sound output opening or openings. With the invention the designer can now freely choose to place the transducer at any convenient place in the telephone. In particular, the transducer can now be placed in positions more remote from the sound output opening. The designer can now choose to place the transducer at an edge or a corner of the housing wall, and the transducer can even be placed on any other suitable structure in the telephone.

A further advantage of the invention is that, for acoustic reasons, virtually no inner air volume in the communications unit is needed. In accordance with the invention the inner air volume in the communications unit forms part of the sound path from the speaker transducer to the user's ear, and the inner air volume forming part of the sound path will have no negative effects on the acoustic properties, and a small air volume is to be preferred over a larger air volume. The invention is thus the ideal solution for modern mobile telephones where small size is a requirement.

In FIG. 1 L3 and R3 represent ia the acoustic impedances due to the most often inevitable leakage in the interface between the housing shells, ie along their edges. The production and assembly tolerances of the housing shells result in uncontrolled and variable leaks or openings in the housing, which in the known telephones result in uncontrolled and unpredictable notches in the frequency response. With the invention the influence of such uncontrolled leaks is minimised.

BRIEF DESCRIPTION OF THE DRAWINGS

Preferred embodiments of the invention will be described below with reference to the enclosed drawings, in which FIG. 1 shows a simplified equivalent diagram of the acoustic impedances in a prior art telephone handset, FIG. 2 schematically a cross section through a mobile telephone in a first embodiment of the invention, and an ear simulator for measuring its performance, FIG. 3 shows a simplified equivalent diagram of the acoustic impedances in the telephone in FIG. 1.

DETAILED DESCRIPTION OF THE INVENTION

Figure 4:
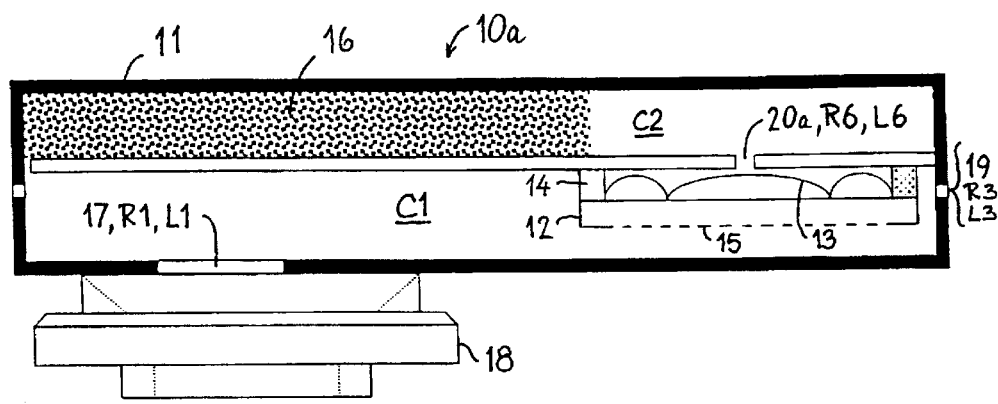
FIG. 4 shows schematically a cross section through a mobile telephone in a second embodiment of the invention, and an ear simulator for measuring its performance.

In FIGS. 2 and 4 a mobile telephone 10, 10a respectively has a housing 11 preferably comprising two shells assembled in a known manner to form a generally closed interior and an exterior of the housing. In the figures, similar structures have the same references in both embodiments. In the housing 11 there is indicated a printed circuit board with electronic components 16 for operating the telephone.

In FIG. 2 an electro-acoustic speaker transducer 12 is secured to the inner side of the housing 11 by means of a ring of adhesive 14. The transducer 12 is of the electro-dynamic type with a diaphragm 13 but other types may also be used. The speaker transducer 12 has a frequency response curve with an elevated low frequency portion, which is called a low frequency boost. The diaphragm shown has a domed profile and facing its convex side towards the housing wall.

Other profiles can be used, such as flat, corrugated or any other suitable profile. The transducer 13 has a first side 15 facing away from the housing wall. In the first side 15 of the transducer there is an acoustic connection to the concave side of the diaphragm 13. This acoustic connection is indicated with a dotted line.

In the housing there is a first volume of air C1 and a first opening 17 in the housing wall. The opening 17 is in the housing wall intended for engagement with a user's ear, and in place of the user's ear an ear simulator 18 is shown. The opening can be placed at the centre line of the telephone or offset therefrom. From the concave side of the diaphragm 13 there is thus an acoustic connection or path through the first side 15 of the transducer, via the first volume C1 of air and the first opening 17 to the ear simulator or the user's ear. The first opening 17 has acoustic impedances L1 representing the mass of the air in the opening, and R1 representing the friction of the air mass. Preferably, the first opening 17 is designed to have a low acoustic impedance, and it can be divided into two or more smaller openings than the one shown, or the opening can be covered by a grid or a mesh.

Through a second opening 19 in the housing wall there is a second acoustic connection or path through the first side 15 of the transducer and the volume C1 of air to the ambient air. The second opening 19 has acoustic impedances L3 and R3 correspondingly representing the air mass and its friction, respectively, in the opening 19. The second opening 19 is designed to equalise in particular the transducer's boost at low frequencies in order to make in particular the low frequency response less dependent on variations in the acoustic loading by the user's ear. The telephone is hereby made leak-tolerant. The two housing shells are designed to match each other along their edges and form a closed housing with the second opening 19 being the only exception. However, the match is most often not perfect, which results in a leak. The second opening 19 is so designed that its acoustic impedance is smaller than the acoustic impedance in the possible leaks, whereby the influence of the leaks is negligible.

A third opening 20 establishes an acoustic connection or path from the convex side of the diaphragm 13 to the ambient air. The third opening has acoustic impedances L5, R5 correspondingly representing the air mass and its friction, respectively, in the opening 20. The third opening 20 with its impedances L5 and R5 is designed to dominate the acoustic performance of the transducer.

When electric signals at audio frequencies are input to the transducer the diaphragm is set into vibration, and acoustic or sound signals are thereby generated on both sides of the diaphragm. From the concave side of the diaphragm sound signals are transmitted through the first side 15 of the transducer into the volume C1, and from the volume C1 further through the first opening 17 to the user's ear and also through the second opening 19 to the ambient air. From the convex side of the diaphragm sound signals are transmitted through the third opening 20 to the ambient air.

In FIG. 3 is shown the electrical equivalent diagram for the above-described structure. The transducer has an acoustic output impedance Z1 and it generates an acoustic sound pressure P. Zear is the acoustic load impedance of the user's ear or of the ear simulator. In the equivalent diagram the impedance of possible leaks will be in parallel with the smaller impedances R3+L3 in the second opening 19. This means that the impedance in the second opening 19 will dominate over the impedance in the leaks. Possible leaks and their variations will thereby have no or only negligible influence on the acoustic performance of the telephone.

In FIG. 4 is shown an alternative embodiment of the invention. Here the transducer is not secured to the housing wall but rather to an internal structure such as a printed circuit board or an internal wall of the mobile telephone. Here a third opening 20a with acoustic impedances R6, L6 establishes an acoustic connection to a closed volume C2 within the telephone. The volume C2 may enclose radio frequency components. Like in FIG. 2, the volume C2 and the acoustic impedances R6, L6 leading into the volume are designed to dominate the acoustic performance of the transducer. The alternative embodiment in FIG. 4 has the same above-mentioned advantages as the embodiment in FIG. 2.

Figure 5:
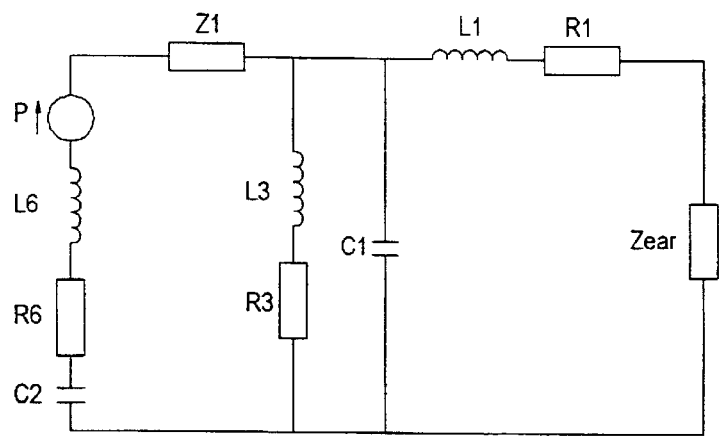
FIG. 5 shows a simplified equivalent diagram of the acoustic impedances in the telephone in FIG. 3.

FIG. 5 shows the electrical equivalent diagram for the structure in FIG. 4.

What is claimed is:

1. An electro-acoustic communications unit (10, 10a) comprising:

a housing (11) with at least two housing shells assembled along respective edges thereof to form a housing wall defining an interior of the housing and an exterior of the housing, the interior of the housing including a volume (C1) of air delimited at least by the at least two shells and at least a portion of the assembled edges of the at least two housing shells, the housing wall having a first opening (17) connecting the volume (C1) of air with the exterior of the housing, a face being defined, on an outer side of the housing wall and in relation to the first opening (17), for engagement of the communications unit with a user's ear (18), and the housing wall having a second opening (19) connecting the volume (C1) of air with the exterior of the housing and being situated outside the face for engagement of the communications unit with a user's ear (18), an electro-acoustic transducer (12) in the interior of the housing (11), the transducer (12) having opposed first (15) and second sides, a first acoustic path including the volume (C1) of air and the first opening (17), the first acoustic path extending from the first transducer side (15) to the exterior of the housing, the first acoustic path being the only acoustic path between the first transducer side (15) and the face for engagement of the communications unit with a user's ear (18), a second acoustic path including the volume (C1) of air and the second opening (19), the second acoustic path extending from the first transducer side (15) to the exterior of the housing.

2. An electro-acoustic communications unit (10a) according to claim 1, wherein a third acoustic path (20a) establishes acoustic path from the second side of the transducer to a second volume (C2) of air in the interior of the housing (11).

3. An electro-acoustic communications unit (10a) according to claim 1, wherein a third acoustic path including a third acoustic opening (19) in the housing wall establishes acoustic path from the second side of the transducer to the exterior of the housing, the third acoustic opening (19) being situated outside the face for engagement of the communications unit with a user's ear (18).

4. An electro-acoustic communications unit (10a) according to claim 1 characterized in that a third acoustic connection (20a) establishes acoustic connection from the second side of the diaphragm (13) to a second volume (C2) of air in the interior of the housing (11).

5. An electro-acoustic communications unit (10) according to claim 1 characterized in that a third acoustic connection including a third acoustic opening (19) in the housing wall establishes acoustic connection from the second side of the diaphragm to the exterior of the housing, the third acoustic opening (19) being situated outside the face for engagement of the communications unit with a user's ear (18).

6. An electro-acoustic communications unit (10, 10a) according to claim 2 characterized in that a second acoustic connection including a second acoustic opening (19) in the housing (11) establishes acoustic connection from the first side of the diaphragm to the exterior of the housing, the second acoustic opening (19) being situated outside the face for engagement of the communications unit with a user's ear (18).

7. An electro-acoustic communications unit (10a) according to claim 2 characterized in that a third acoustic connection (20a) establishes acoustic connection from the second side of the diaphragm (13) to a second volume (C2) of air in the interior of the housing (11).

8. An electro-acoustic communications unit (10a) according to claim 3 characterized in that a third acoustic connection (20a) establishes acoustic connection from the second side of the diaphragm (13) to a second volume (C2) of air in the interior of the housing (11).

9. An electro-acoustic communications unit (10) according to claim 2 characterized in that a third acoustic connection including a third acoustic opening (19) in the housing wall establishes acoustic connection from the second side of the diaphragm to the exterior of the housing, the third acoustic opening (19) being situated outside the face for engagement of the communications unit with a user's ear (18).

10. An electro-acoustic communications unit (10) according to claim 3 characterized in that a third acoustic connection including a third acoustic opening (19) in the housing wall establishes acoustic connection from the second side of the diaphragm to the exterior of the housing, the third acoustic opening (19) being situated outside the face for engagement of the communications unit with a user's ear (18).

11. An electro-acoustic communications unit (10) according to claim 2, wherein a third acoustic path including a third acoustic opening (19) in the housing wall establishes acoustic path from the second side of the transducer to the exterior of the housing, the third acoustic opening (19) being situated outside the face for engagement of the communications unit with a user's ear (18).

* * * * *